July 2, 1974 J. B. SHORE Re. 28,061

PERFORATING APPARATUS

Original Filed June 23, 1971

James B. Shore
INVENTOR

BY E. L. Richardson Jr.
ATTORNEY

United States Patent Office

Re. 28,061
Reissued July 2, 1974

28,061
PERFORATING APPARATUS

James B. Shore, Friendswood, Tex., assignor to Schlumberger Technology Corporation, New York, N.Y.

Original No. 3,717,207, dated Feb. 20, 1973, Ser. No. 155,963, June 23, 1971. Application for reissue Apr. 9, 1973, Ser. No. 349,591
Int. Cl. E21b *43/117*
U.S. Cl. 175—4.6 19 Claims

Matter enclosed in heavy brackets [ ] appears in the original patent but forms no part of this reissue specification; matter printed in italics indicates the additions made by reissue.

ABSTRACT OF THE DISCLOSURE

In the representative embodiment of the present invention disclosed herein, shaped charges adapted for installation in a typical end-loaded carrier are respectively provided with a rigid annular retainer member which is movably disposed on the forward end of each charge. *Inclined camming* [Camming] surfaces are cooperatively arranged for shifting the retainer member forwardly in relation to the shaped charge once it is installed in the carrier facing and aligned with a lateral port therein. *To reliably secure the retainer in its forward position, the camming surfaces are terminated by flat or transverse surfaces cooperatively arranged to prevent the rearward movement of the retainer under shaking or vibration of the carrier.* In this manner, when the port plug is installed in the port, it will engage the retainer and tightly anchor the shaped charge in position.

One of the more typical oil field perforators in common usage today is comprised of an enclosed tubular body having one or more laterally-directed shaped explosive charges mounted at longitudinally-spaced intervals therein and operatively associated with electrically-responsive detonating means. As is typical, the perforator body or so-called "carrier" is a heavy-walled cylinder designed to withstand the extreme explosive forces produced by the detonation of the explosives carried therein. To permit the carrier to be reused, each shaped charge is respectively faced toward a lateral port in the carrier body which is customarily covered by an expendable port-closure member such as a threaded plug which is fluidly sealed in the port. Those skilled in the art will recognize, of course, that for a given carrier size, significantly larger shaped charges can be employed where the charges can be insterted into one end of the carrier rather than being installed through the lateral ports in the carrier wall.

Many mounting arrangements have, of course, been proposed heretofore for such "end-loaded carriers" to retain the shaped charges accurately aligned with their associated ports despite the sharp impacts and severe operating conditions which perforating apparatus customarily encounters during typical perforating operations. For example, one typical mounting arrangement (as shown in Pat. No. 3,246,707 at "60") employs a metallic apertured cover or a truncated conical sleeve which is secured over the forward end of a shaped charge and adapted for contacting its associated port plug to firmly secure the shaped charge in position when the port plug is installed into the port opening. Similarly, another common design employs a thick resilient sleeve which is coaxially mounted around the forward end of a shaped charge and adapted to be axially compressed between the base of the port plug and the charge case as the plug is tightened.

It has been found, however, that alignment devices such as these significantly impair the formation of the perforating jet which is produced upon detonation of the shaped charge. In particular, since such retainers are typically mounted just ahead of the shaped charge liner and must converge forwardly at a steep angle to engage the base of the port plug, these retainers have been found to lie in the path of the liner materials which are driven inwardly and forwardly from the skirt or forward portion of the liner as the liner is collapsed by the explosive forces developed upon detonation of the shaped charge. Interference of this nature will, of course, substantially affect the overall performance of the shaped charge.

Accordingly, it is an object of the present invention to provide new and improved perforating apparatus having one or more shaped explosive charges which are secured in an enclosed end-loaded carrier in precise alignment with their respectively-associated port-closure members without impairing the operating performance of the shaped charges.

This and other objects of the present invention are attained by movably disposing annular retainer means on a shaped explosive charge for movement thereon *from* [between] a first or retracted position permitting placement of the shaped charge within an enclosed carrier facing a lateral port *to* [and] a second or extended position *in which the retainer means are secured in* [for] abutment with a port-closure member installed in the lateral port for tightly securing the shaped charge in the carrier and in alignment with the port.

The novel features of the present invention are set forth with particularity in the appended claims. The invention, together with further objects and advantages thereof, may be best understood by way of the following decription of exemplary apparatus employing the principles of the invention as illustrated in the accompanying drawings, in which:

Figure 1:
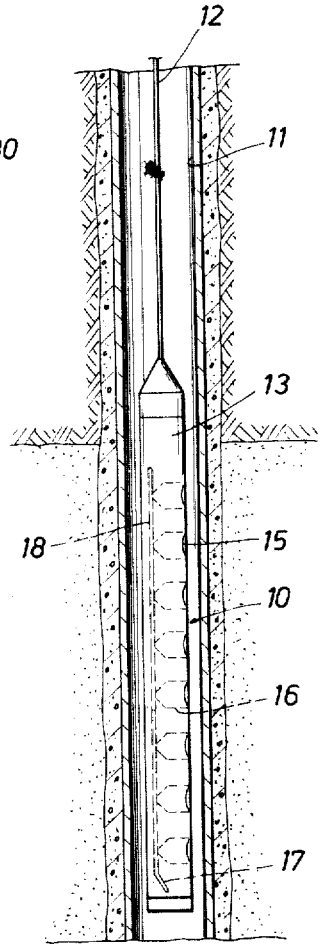
FIG. 1 shows typical perforating apparatus employing the principles of the present invention.

Turning now to FIG. 1, new and improved perforating apparatus 10 incorporating the principles of the present invention is depicted as it will appear when suspended in a well bore 11 by a typical electrical cable 12. As illustrated, the perforating apparatus 10 includes an elongated tubular body or carrier 13 having a plurality of longitudinally-spaced side openings or ports 14 which are respectively fluidly sealed and closed by a port-closure member such as at threaded plug 15. The perforating apparatus 10 further includes perforating means which, in the preferred embodiment of the present invention, are comprised of a plurality of laterally-directed shaped explosive charges 1 disposed at longitudinally-spaced intervals in the carrier 13 and, as will subsequently be explained, are secured therein respectively facing the lateral ports 14. As is typical, the perforating means further include selectively-operable detonating means such as in electrically-responsive blasting cap 17 operatively coupled to a length of detonating cord 18 that is mounted in detonating proximity of each of the shaped charges 16.

Figure 2:
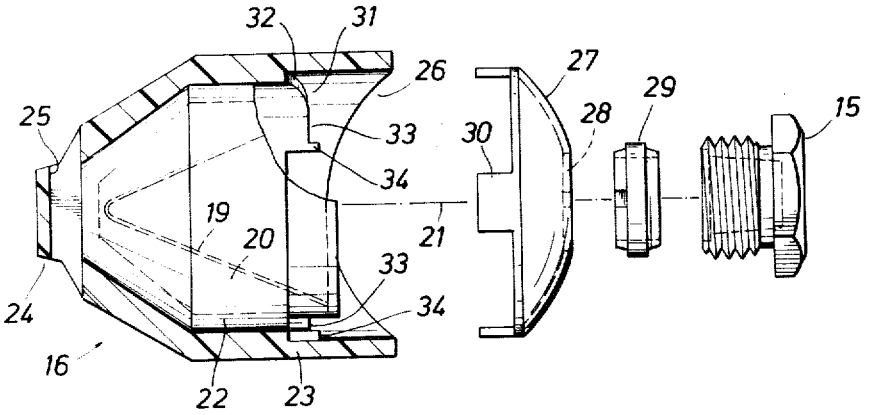
FIG. 2 depicts a preferred embodiment of the new and improved perforating apparatus of the present invention.

As best seen in FIG. 2, in the preferred embodiment of the shaped charges 16, a typical shaped charge liner 19 is operatively disposed in the hollowed forward end of an explosive pellet 20 and adapted for producing, upon detonation, a perforating jet which is directed along a selected perforating axis 21 toward the right as viewed in the drawings. The shaped charge 16 further includes a cylindrical container which in the illustrated preferred embodiment is comprised of a metallic inner jacket 22 and an outer case 23 of a suitable plastic material for miniminizing the effects of laterally-directed explosive forces on the interior walls of the carrier 13. The rear of the outer case 23 is reduced as illustrated to provide a rearwardly-projecting axially-aligned boss 24 having a slot or opening 25 for retaining the detonating cord 18 within detonating proximity of the explosive pellet 20. Since the outer case 23 must complementally fit the internal configuration of the carrier 13, the forward end of the case is rounded, as at 26, in a plane perpendicular to the plane of the drawings.

To selectively secure the shaped charge 16 in position within the carrier 13, the preferred embodiment of the present invention includes retaining means, such as a somewhat-hemispherical rigid member 27 having a central opening 28 formed therein and an annular spacer 29, which are cooperatively arranged to be movably positioned along the axis 21 between the case 23 and the closure plug 15. The present invention further includes camming means which, in the preferred embodiment illustrated in FIG. 2, are provided by a corresponding number of equally-distributed rearwardly-directed projections or legs 30 on the hemispherical retainer 27 and forwardly-facing axially-inclined cam surfaces 31 disposed around the interior wall of the forward end of the case 23.

It will be appreciated, therefore, that when the legs 30 of the retainer 27 are disposed on the camming surfaces 31, clockwise rotation (as viewed in FIG. 3) of the retainer in relation to the shaped charge 16 and about the axis 21 will cause the retainer to advance forwardly along the axis 21 and relative to the case 23 from an initial rearward position to a forward position. The amount of forward or axial advancement of the retainer 27 in relation to the charge 16 will, of course, be determined by the longitudinal or axial spacing between the rearward surfaces 32 and the forward *transversely-disposed flat* surfaces 33 on opposite ends of the cammnig surfaces 31. Shoulders, as at 34, are preferably arranged on the forward surfaces 33 to prevent continued clockwise rotation of the retainer 27 once the legs 30 are engaged on the *flat* forward surfaces 33.

Figure 3:
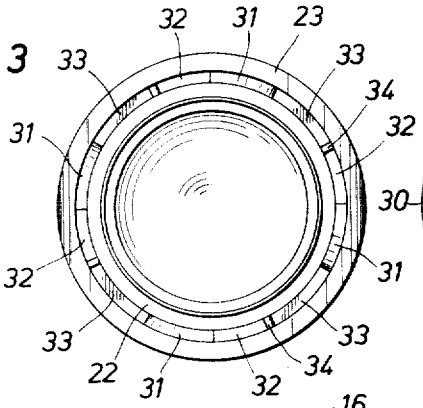
FIGS. 3 and 4 are additional views showing the details of the preferred apparatus illustrated in FIG. 2.
Figure 4:
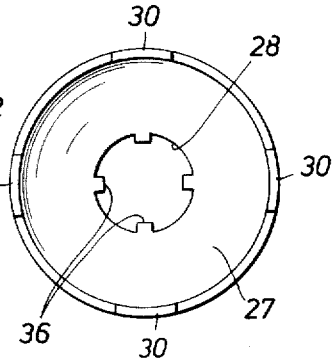

Accordingly, it will be recognized from FIGS. 2–4 that when the legs 30 are engaged on the rearward surfaces 32, the retainer 27 will be withdrawn into the forward end of the case 23; and, by appropriately dimensioning the several elements of the present invention in relation to the carrier 13, the forward end of the retainer will be at least substantially confined within the forward case end. Conversely, upon clockwise rotation of the retainer 27 in relation to the shaped charge 16, the retainer will be advanced forwardly along the axis 21 to a second or forward position where the forward face of the retainer is projected at least slightly ahead of the case 23.

Figure 5:
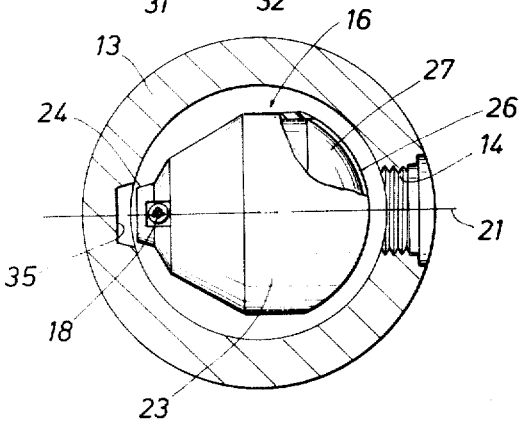
FIGS. 5 and 6 are enlarged cross-sectional views respectively illustrating the assembly of the apparatus of FIG. 2.

Turning now to FIG. 5, the shaped charge 16 is shown positioned in the carrier 13 adjacent to and facing one of the ports 14 and in coincidental alignment therewith. As illustrated, the internal rear wall of the carrier 13 is provided with an inwardly-facing recess 35 which is coincidentally aligned with the port 14 and complementally shaped to partially receive the boss 24. The detonating cord 18 is disposed in the opening 25. At this time, the retainer 27 is angularly oriented in relation to the shaped charge 16 so as to locate the legs 30 on the rearward surfaces 32 and thereby retracting the retainer into the forward end of the case 23. This will, of course, allow the shaped charge 16 to be installed through one end and into the carrier 13 by a typical loading tool (not shown) and held in the illustrated position until the charge is secured into position.

Figure 6:
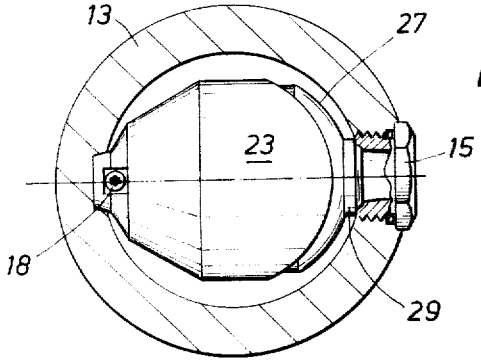

Once the charge 16 is positioned, the retainer 27 is rotated in a clockwise direction, by inserting a tool (not shown) into the port 14. In the preferred embodiment illustrated, slots or lugs, as at 36, are arranged in the retainer opening 28 for engagement by this tool to rotate the retainer 27. Rotation of the reainer 27 will bring the legs 30 up the camming surfaces 31 onto the forward *flat* surfaces 33 until the legs contact the stops 34. Then, as illustrated in FIG. 6, the retainer spacer 29 is inserted into the opennig 28 and the port plug 15 is threaded into the port 14 until the base of the plug is engaged with the spacer to firmly seat the boss 24 in the recess 35 and secure the charge 16 between the rear wall of the carrier 13 and the base of the port plug. It will be recognized, of course, that the plug 15 is tightened until the legs 30 are tightly engaged against the *flat* surfaces 33.

Accordingly, it will be recognized that the present invention has provided new and improved perforating apparatus in which one or more shaped charges can be firmly secured in an end-loaded carrier and accurately positioned in coincidental alignment with their respective lateral ports. Moreover, by virtue of this new and improved apparatus, undue interference with the perforating jet is eliminated.

While a particular embodiment of the present invention has been shown and described, it is apparent that changes and modifications may be made without departing from this invention in its broader aspects; and, therefore, the aim in the appended claims is to cover all such changes and modifications as fall within the true spirt and scope of this invention.

What is claimed is:

1. Perforating apparatus comprising: a tubular body having a lateral port in a wall thereof providing access to the internal bore thereof; perforating means in said body and including shaped explosive charge means transversely oriented in said internal bore and having its forward end facing said port; and means cooperatively securing said shaped charge means in coincidental alignment with said port including rigid retainer means movably disposed between said shaped charge means and said port, camming means cooperatively arranged between said retainer means and said shaped charge means and adapted for axially shifting said retainer means forwardly in relation to said shaped charge means upon rotation *in one direction* of said retainer means from a rearward retainer position permitting insertion of said transversely-oriented shaped charge means and said retainer means into said internal bore to a forward retainer position where a forward portion of said retainer means is advanced ahead of said forward end of said shaped charge means, *retainer-securing means cooperatively associated with said camming means for securing said retainer means in said forward retainer position against rotation in the opposite direction*, and means adapted for insertion into said port for closing said port and engaging said forward end of said retainer means for securing said shaped charge means between said retainer means and the opposite wall of said body.

2. The perforating apparatus of claim 1 further including a rearwardly-directed portion on said shaped charge means, and a recess in said opposite wall of said body coincidentally aligned with said port and adapted to at least partially receive said rearwardly-directed portion of said shaped charge means.

3. The perforating apparatus of claim 1 wherein said perforating means further include electrically-responsive detonating means cooperatively associated with said shaped charge means and adapted for detonating said shaped charge means in response to an electrical signal.

4. The perforating apparatus of claim 1 wherein said retainer means include an annular member having a forwardly-curved forward end and a rearwardly-directed annular portion coaxially arranged around said shaped charge means defining a first part of said camming means; and said shaped charge means having a forwardly-directed annular portion defining a second part of said camming means.

5. The perforating apparatus of claim 4 wherein one of said annular portions includes an inclined surface defining one of said first and said second parts of said camming means and the other of said annular portions includes a cooperative surface defining the other of said first and second parts of said camming means.

6. The perforating apparatus of claim 4 wherein said rearwardly-directed portion of said annular member includes a plurality of outstanding legs *defining said first part of said camming means* and said forwardly-directed portion of said shaped charge means includes a plurality of axially-inclined surfaces *defining said second part of said camming means and* adapted for engagement by said outstanding legs for advancing said annular member upon its rotation in relation to said shaped charge means.

7. Perforating apparatus comprising: a tubular body adapted for suspension in a well bore and having at least one laterally-directed threaded port therein providing access to the internal bore of said body; perforating means in said body and including a shaped explosive charge disposed in a cylindrical case member uniformly arranged around the perforating axis of said shaped explosive charge and having a forward portion projecting forwardly of said shaped explosive charge; and retaining means adapted for securing said shaped explosive charge transversely in said body facing said threaded port and in coincidental alignment therewith and including a rigid annular retainer member coaxially arranged around said perforating axis between said shaped explosive charge and said threaded port, camming means including first and second coengaged surfaces cooperatively arranged on said members for axially advancing said retainer member *to an extended position* ahead of said forward case portion upon rotation of said retainer member, *retainer-securing means including a third surface adjacent to said first surfaces and transversely related thereto cooperatively arranged for engagement by said second surfaces upon advancement of said retaining member to its said extended position for restricting the return of said retainer member from its said extended position,* and means including a threaded port-closure member adapted for engagement with said retainer member in its said extended position.

8. The perforating apparatus of claim 7 wherein said retainer member is disposed within said forward case portion and is movable from a retracted position therein to *said* [an] extended position upon rotation of said retainer member.

9. The perforating apparatus of claim 8 wherein said first surfaces are comprised of a plurality of axially-inclined surfaces distributed circumferentially around said forward case portion, [and] said second surfaces are comprised of a corresponding number of rearwardly-projecting legs on said retainer member, *and said third surfaces are comprised of a corresponding number of surfaces respectively joining the forward ends of said first surfaces.*

10. The perforating apparatus of claim 8 wherein said first surfaces are inclined axially and said second surfaces are transverse to said perforating axis.

11. The perforating apparatus of claim 10 wherein said first *and third* surfaces are on said case member and said second surfaces are on said retainer member.

12. A shaped charge assembly adapted for installation in an enclosed tubular carrier and facing a lateral port in the wall of such a carrier, said assembly comprising: a cylindrical case having an open forward portion complementally shaped to conform to the internal wall of a tubular carrier and a closed rearward portion adapted to receive a shaped explosive charge; a shaped explosive charge disposed in said closed case portion and faced forwardly toward said open case portion; an annular retainer member movably disposed on said open case portion; [and] camming means cooperatively arranged between said retainer member and said forward case portion and adapted for moving said retainer member *in an extended position* ahead of said forward case portion upon rotation of said retainer member *in one direction; and retainer-securing means cooperatively associated with said camming means for securing said retainer member in its said extended position against rotation in the opposite direction.*

13. The assembly of claim 12 wherein said retainer member is received within said forward case portion ahead of said shaped explosive charge.

14. The assembly of claim 12 wherein said camming means are comprised of *axially-inclined first* surfaces on said forward case portion and *transverse* second surfaces on said retainer member cooperatively engaged with said first surfaces and adapted for axially advancing said retainer member forwardly upon rotation of said retainer member.

15. The assembly of claim 14 wherein said retainer member is received within said forward case portion ahead of said shaped explosive charge.

16. The assembly of claim 14 wherein when said retainer member is rearwardly position relative to said forward case portion, said retainer member is in the path of jet particles emanating from said shaped explosive charge upon its detonation, and when said retainer member is positioned forwardly relative to said forward case portion said retainer member is out of said jet particle path.

*17. The perforating apparatus of claim 5 wherein said retainer-securing means include a retaining surface on said one annular portion adjacent to said inclined surface and transversely oriented in relation thereto for engagement by said cooperative surface on said other annular portion rotation of said annular member to said forward retainer position.*

*18. The perforating apparatus of claim 6 wherein said retainer-securing means include a plurality of retaining surfaces on said forwardly-directed portion of said shaped charge means respectively adjacent to said axially-inclined surfaces and transverse in relation thereto for engagement by said outstanding legs upon continued rotation of said annular member after it reaches said forward retainer position.*

*19. The assembly of claim 14 wherein said retainer-securing means are comprised of transverse third surfaces on said first surfaces and adapted for engagement by said second surfaces upon rotation of said retainer member to its said extended position.*

References Cited

The following references, cited by the Examiner, are of record in the patented file of this patent or the original patent.

UNITED STATES PATENTS

| | | | |
|---|---|---|---|
| 2,680,406 | 6/1954 | Austin | 89—1 C X |
| 2,742,857 | 4/1956 | Turechek | 102—20 |
| 2,765,739 | 10/1956 | Mohoupt et al. | 175—4.6 |
| 2,844,098 | 7/1958 | Castel | 175—4.6 |

DAVID H. BROWN, Primary Examiner

U.S. Cl. X.R.

89—1 C

UNITED STATES PATENT OFFICE

CERTIFICATE OF CORRECTION

PATENT NO. : Re. 28,061

DATED : July 2, 1974

INVENTOR(S) : JAMES B. SHORE

It is certified that error appears in the above-identified patent and that said Letters Patent are hereby corrected as shown below:

Column 6, line 38, following "portion" insert -- upon --.

Column 6, line 51, following "on said" insert -- forward case portion respectively adjacent to the forward ends of said --.

Signed and Sealed this

*eighteenth* Day of *May 1976*

[SEAL]

*Attest:*

RUTH C. MASON
*Attesting Officer*

C. MARSHALL DANN
*Commissioner of Patents and Trademarks*